INVENTOR.
WILLIAM A. BARNES
ATTORNEYS

United States Patent Office 2,861,489
Patented Nov. 25, 1958

2,861,489

PIVOT LEVER RETAINER FOR RATCHET POWERED DEVICE

William A. Barnes, Utica, N. Y., assignor, by mesne assignments, to Kelsey-Hayes Company, Detroit, Mich., a corporation of Delaware Application January 30, 1956, Serial No. 562,253

7 Claims. (Cl. 81—15)

This invention relates to rotary ratchet devices operated by a swingable lever carrying a pawl to engage the ratchet.

The primary object of this invention is to provide a pawl driven toothed device wherein the teeth of the toothed device have forward faces to engage with the pawl in pawl retaining drive transfer relationship, and the teeth have back surfaces cooperating with the pawl to cam the pawl around a tooth to thereby index the pawl for a succeeding power stroke, and providing at least one such tooth back surface formed to engage the pawl and produce the cam index producing force, but of such low intensity that a far greater pawl indexing force is required than for the remaining teeth, thereby to retain the pawl engaged to the tooth until forcibly ejected.

Another object of this invention is to provide a ratchet driven device having a pawl drive, wherein the pawl locks with the ratchet at the end of a work cycle in a stroke end position to prevent the unintentional commencement of a new work cycle.

Another object of this invention is to provide a hand tool having two levers, at least one of which is a pivoted lever, driving a rotary ratchet wheel through a pawl, in which the pawl cooperates with the rotary ratchet wheel to hold the levers in a closed relative position at the end of a work cycle.

Another object of this invention is to provide a hand tool having jaws operable by a rotary ratchet mechanism, with a pivoted handle and pawl means for driving the ratchet, and the ratchet mechanism and pawl locking together with the pivoted handle in a closed position at the end of a work cycle.

Still another object of this invention is to provide the handle holding function as a result of a balance of forces; the forces being overcome to start a new work cycle by manually forcing the handles apart.

Yet another object of this invention is to provide a rotary ratchet drive mechanism with a pivoted drive lever with pawl means, wherein the lever is pivoted on the side of the ratchet opposite the grip portion of the lever to thereby provide greater leverage mechanical advantage in a given overall tool length.

Although this invention is a separate invention without particular relationship to any other invention, nevertheless reference is hereby made to a copending application Serial Number 559,605 filed January 17, 1956, which is closely related in structure and provides a workable background for the present invention.

Another invention of a similar nature is presented in a co-pending patent application entitled "Ratchet and Cam Actuated Tool" filed February 8, 1956, and bearing Serial No. 564,165. This co-pending application presents an invention of Walter J. Rozmus, and it is of general interest because it is also directed to a hand operated ratchet device suitable for crimping electric terminals. The Rozmus invention, like the above-referenced co-pending Barnes application, provides a workable background for the present invention although it is a separate invention.

Other objects and a fuller understanding of the invention may be had by referring to the following description and claims, taken in conjunction with the accompanying drawings, in which:

Figure 1:
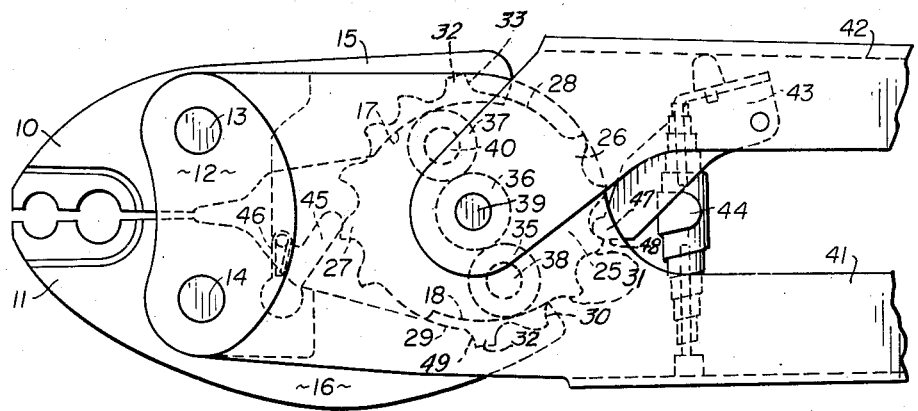
Figure 1 is a side elevational view of a pivoted jaw tool designed principally for crimping electrical connectors, and being actuated by a rotary ratchet device and a pivoted lever with pawl means embodying the preferred form of the lever handle hold down structure of this invention; the tool being illustrated in an intermediate operational condition wherein the jaws are being closed.

Hand tools actuated by pivoted handles are a basic form of mechanical advantage devices. Some are provided with two relatively movable handles, whereas others have one holding handle and one pivoted handle. Some such tools are unbiased and must be manually moved in both directions. Others have a spring urging the handles to an open condition and the operator is required only to force the handle, or handles, in one direction.

Rotary ratchet drive devices are not limited to hand tools, in the general meaning of the term, but among such hand tools are those actuated by rotary ratchet drive devices driven by a pivoted handle or handles.

Tools having handles which are urged to an open position such as by a spring, are quite troublesome to store and are even more difficult to carry in a pocket. The handles tend to catch on clothing and have a strong tendency to work themselves out of any but a very deep pocket. The exasperating problem of storing such tools in a tool box will be appreciated by even those who may not have had actual experience in such storage problems.

The usual solution to such pocket and tool box storage is to provide some sort of external lock device. Pruning shears are a common example. Such lock devices may be acceptable in some devices, but are not generally the most satisfactory arrangements because of the tendency of the lock to engage when not desired, as well as being a finger pinching hazard and generally a nuisance when unlocked.

The present invention is a full solution to such problem in tools having the necessary environment where a balance of forces can be employed to prevent such handle opening at the end of a work cycle stroke, and the handles again activated by manual forcing to change the balance.

For the purpose of illustrating the present invention in an operative and useful structure, an electrical terminal crimping device has been selected. As set forth in the drawings, the tool embodies a jaw 10 and a jaw 11 each having a conventional crimping forward end portion. Two matched sets of half round dies are illustrated, although any work performing construction may be substituted therefor.

The jaws 10 and 11 are pivotally mounted by means of an interconnecting link 12 having a pivot 13 mounting the jaw 10 and a pivot 14 mounting the jaw 11. Extending from the pivot 13, the jaw 10 has a drive receiving lever end 15, and the jaw 11 is provided with a similar drive receiving lever end 16. Therefore, by driving the lever ends 15 and 16 apart, a work closing force will be exerted upon the work ends of the jaws 10 and 11. A cam actuating device of improved construction provides such drive opening force.

On the inner side of the drive lever 15 there is provided a cam surface 17. On the inner side of the drive lever 16 there is provided a cam driven surface 18. A spring 19, which is set forth only in Figure 3 of the drawings in order to eliminate confusion from overlapping parts in the remainder of the views, is employed to pull the levers 15 and 16 together and urge the work portion of the jaws 10 and 11 to an open position. Spring 19 is only one such means of urging the jaws 10 and 11 to a given position. Therefore, the maximum closed position of the drive levers 15 and 16, and the maximum open position will be considered to be a work field. The cam surfaces 17 and 18 are in opposed facing relationship defining an included drive field therebetween.

Figure 2:
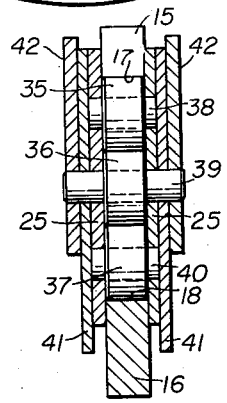
Figure 2 is a section taken along line 2—2 of Figure 3.

Figure 2 illustrates the actual construction of the illustrated embodiment, although this construction is not the only suitable construction. Figure 2 illustrates the fact that stampings are used largely as the structural parts. The ratchet and roller construction, to be more fully described hereinafter, may here be seen to consist of a double ratchet wheel with rollers therebetween.

In the two jaw version of the terminal crimping tool set forth in Figure 1 of the drawings, there are illustrated three roller members 35, 36 and 37 positioned in surface contacting series with one another across the drive field between the opposed cam surfaces 17 and 18.

A rotary ratchet device has been provided to revolvably drive the three rollable members in a work cycle. To this end, a ratchet wheel 25 is rotatably mounted and serves as a carriage for the rollers 35, 36 and 37. Stud bearings 38, 39 and 40 are employed to mount the three rollers on a side face of the ratchet wheel 25. Therefore, as the ratchet wheel 25 is driven the series of rollers will be caused to revolve and wedge between the cam driving surfaces 17 and 18. The shape of the surfaces 17 and 18 may be readily altered to produce any desired type of resultant movement of the jaws 10 and 11 for rapid initial closing followed by the desired slow movement under high pressure.

To facilitate the handling of the tool, and to provide a manual drive for the ratchet wheel 25, there is provided a handle 41 which is fixed and serves substantially no other purpose than to support the tool. By contrast, handle 42 is pivotally mounted on the tool and serves principally as a drive lever. Preferably, as a feature of this invention, the handle is pivoted on the same center as ratchet wheel 25. A pawl 43 is carried by the handle 42 and is positioned to act in the well known manner of such pawl devices upon the ratchet wheel 25. This tool can be used with a slow, powerful, one hand progression by opening the handle enough to take one notch at a time. By using two hands and opening the handles wider to take two notches, the progression speed is doubled. A coiled spring 44 is employed to urge the handle lever 42 to an open position relationship with respect to handle 41.

However, the ratchet wheel 25 is not conventional in all aspects. Ratchet wheel 25 is provided with two separate series of ratchet teeth indicated by the reference character 26 for one series, and the reference character 27 indicating the other series. Blank or toothless areas 28 and 29 separate the tooth series 26 from the tooth series 27.

Figure 3:
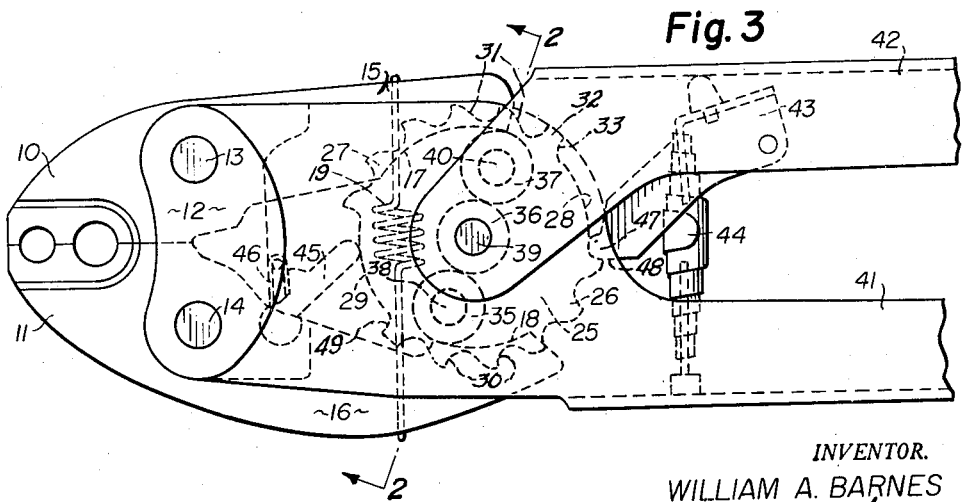
Figure 3 illustrates the tool with the jaws fully closed under the final drive of the pivoted handle.
Figure 4:
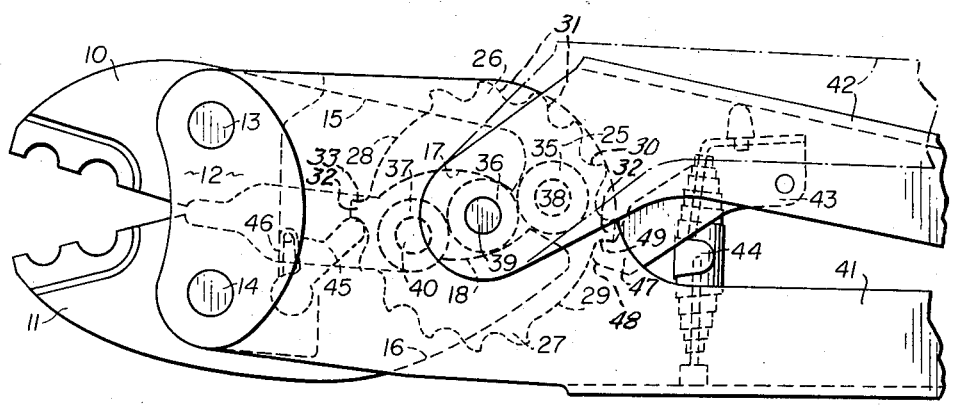
Figure 4 illustrates the rest or dwell position condition of the tool with the jaws fully opened and the pivoted lever remaining in the closed condition as in Figure 2 by a balance of forces according to the principles of this invention; and, Figure 5 is an elevational view of a modification providing a forward pivotal mounting for the lever handle.

As may be readily understood by examining the Figures 1, 3 and 4 only a reversal of the position of the roller series through 180 degrees is required to produce a complete work cycle. Therefore, a complete 360 degree revolution of the ratchet wheel 25 will produce two complete work cycles.

Referring first to Figure 4 of the drawings, it may be observed that the levers 15 and 16 are in their maximum closed position under the drive of spring 19. The series of rollers is positioned in an angular direction between the closed levers 15 and 16. The form of the cam surface 18 is modified somewhat at the forward portion in order to permit maximum closing with respect to the roller 37, whereas the length of the lever 15 is foreshortened in order to permit the lever to drop down between rollers 35 and 36. Therefore, at the first revolving movement of the roller series, a fast opening action will result as the series of rollers begins to wedge between the surfaces 17 and 18. This initial movement produces fast closing of the work ends of jaws 10 and 11. After the roller series has been revolved sufficiently to position the end rollers 35 and 37 against the operative surfaces 17 and 18, or substantially in the position as shown in Figure 1, then the closing movement is slowed considerably and is determined entirely by the provided form of the surfaces 17 and 18. When the roller series is substantially vertical between the ends of the levers 15 and 16, substantially as shown in Figure 3 of the drawings, the work ends of jaws 10 and 11 are closed to their maximum closed position and the maximum force is exerted by the roller series between the levers 15 and 16.

When the roller series revolves slightly past the maximum opening position as set forth in Figure 3, the roller 37 will drop off of the end of lever 15, and the roller 35 will drop into the pocket on the forward end of the surface 18. The wedging action is lost instantaneously. The blank areas 28 and 29 have been provided on the surface of the ratchet wheel 25 to allow free movement without overriding the pawl 43. The extent of the blank areas 28 and 29 is sufficient to permit the roller series to resume the position shown in Figure 4 before the tooth series is again presented for contact by pawl 43. The roller series, now reversed 180 degrees, has completed one work cycle. It will be readily apparent that the work cycle may be repeated a second time before a full 360 degree revolution has been completed by the ratchet wheel 25.

In order to prevent reversed movement of the ratchet wheel 25 by reaction forces between power steps by the pawl 43, a detent 45 is positioned on the forward area of the ratchet wheel and is urged against the tooth series by means of a spring 46.

The present invention is ideally suited to the environment of the operating rotary ratchet mechanism which has been described and explained. According to this invention the pawl 43 engages and drives the ratchet wheel 25 in substantially the normal and well understood manner, with certain new and improved features providing the function of this invention.

The pawl 43 has a forward tooth engaging end 47. This end 47 has forward and lower surface area 48 adapted to fit into complementary pawl receiving surface 30 of the teeth on the ratchet wheel 25. Therefore, as in conventional pawl operated drive mechanisms, as the handle 42 is pivoted to a closed position with respect to the holding handle 41, the pawl end 47 is driven downwardly into engagement with the receiving surface 30 of a given tooth and by this means transmits a component of the force in the direction of rotation of the ratchet wheel 25.

Each of the teeth on the wheel 25 is also provided with a back surface 31. The tooth engaging end 47 has a top cam area 49 which normally engages the back cam surfaces 31 of the ratchet wheel on the reverse movement of handle 42. A spring 44 is provided to urge the handle 42 away from the handle 41 in the usual manner. As shown in the embodiment set forth in Figures 1 through 4, this spring is engaged with the pawl forward of the pivot and accordingly serves the dual function of urging the handles apart and urging the pawl into engagement with the wheel 25. The cam action of the back surface 31 of a particular tooth, and the top cam area 49 of the pawl produces a component of force acting against the urging power of the lever arm action caused by the location of the spring 44 and causes the pawl to pivot outwardly and around the next succeeding tooth in the series to index the pawl for another drive action. The spring 44 is provided to urge the handle 42 away from the handle 41 to position the handle 42 in a beginning position and to produce the indexing of the pawl 43. The strength of spring 44 is such that the cam action produced between the cam back surface 31 and the top cam area 49 of the pawl is more than sufficient to overcome the lever arm action.

It is desired that the indexing action thus described take place between the individual teeth of the series in order to permit one handed operation of the tool through a work cycle.

It is desirable to keep the handle 42 close to the handle 41 at the end of a work cycle for the reasons set forth. Therefore, according to this invention, any selected tooth may be converted into a holding tooth. This holding tooth will not provide the necessary disengaging component of force between the cam back surface 31 and the top cam area 49 to overcome the urge of spring 20. In the environment set forth to illustrate this invention, the ratchet wheel 25 has two series of teeth 26 and 27. Two series are provided in order to accomplish a rapid closing and the necessary power for which the tool is designed without an unnecessarily large number of strokes of handle 42. Under other circumstances, only one series of teeth may be provided and only one work cycle accomplished in a complete revolution of the ratchet wheel 25. Nevertheless, in the environment disclosed, each series of teeth 26 and 27 is provided with an end tooth in the series designated as a pawl holding tooth and indicated by the reference character 32. Under the operation of the tool previously described, the ratchet mechanism collapses from the position illustrated in Figure 3 to the starting position illustrated in Figure 4. Therefore, the driving stroke produced by engagement of the pawl with the last tooth of series 26 in Figure 3 results in a rapid rotation of wheel 25 under the urge of the spring 19. Accordingly, no tooth are provided along the surface of the wheel 25 for a distance equal to the amount of rotation produced by this collapsing movement. Thus, the blank spaces 28 and 29 result. In Figure 3, the holding tooth 32 of series 27 is positioned near roller 37 and above the pawl 43. Referring then to Figure 4, it will be seen that this same holding tooth 32 has rotated under the collapsing drive rotation to a position engaged with the top cam area 49 of the pawl 43. This action takes place so rapidly from Figure 3 to Figure 4 that no substantial movement of handle 42 can take place before the engagement is accomplished.

The cam back surface 31 of these particular holding teeth 32 is shaped differently than the balance of the teeth. These particular teeth have a flattened back surface indicated by the reference character 33. All of the cam back surfaces 31 are in fact cam surfaces which will produce a component of force tending to pivot the pawl 43 against the lever arm action. However, the particular surfaces 33 are modified to produce a very small resultant force, and consequently require a considerably large force upon the handle 42 to produce sufficient resultant disengagement component of force to overcome the lever arm action. Thus, each tooth back surface 31 will produce a cam action which tends to rotate the pawl 43 and produce the described indexing action, but the holding teeth 32 produce such a small reaction component that the spring 44 cannot provide sufficient driving force to produce the necessary component. Therefore, a balance of forces results which fails to disengage the pawl end 47 from a cam back surface of a pawl holding tooth and the handle 42 therefore is held in a closed position. The ratchet wheel 25 being held and limited to one direction of movement cannot reverse and thus allow the handle to open. Therefore, at the end of a work cycle, by the provision of the particularly shaped low resultant holding tooth surface, the normally opened handle relationship is prevented and the handles are held in a storage position which permits easy storage or pocket carrying of the tool having this structure.

In order to overcome the holding action, there is no need to resort to manually released latches or similar holding devices as previously provided to retain a tool in a closed position. According to this invention, the holding teeth are provided with true cam back surfaces just as the balance of the surfaces 31, but with a very low resultant component of force. Accordingly, all that is needed is a greater opening force than is normally provided by spring 44. The operator produces the additional force manually, and when sufficient opening force is applied the cam action will overcome the holding power of the lever arm action and the pawl 43 immediately indexes to the first tooth pawl receiving surface 30 on the opposite side of the holding tooth 32 from the cam back surface 33, and the next cycle of operation can then begin.

Figure 5:
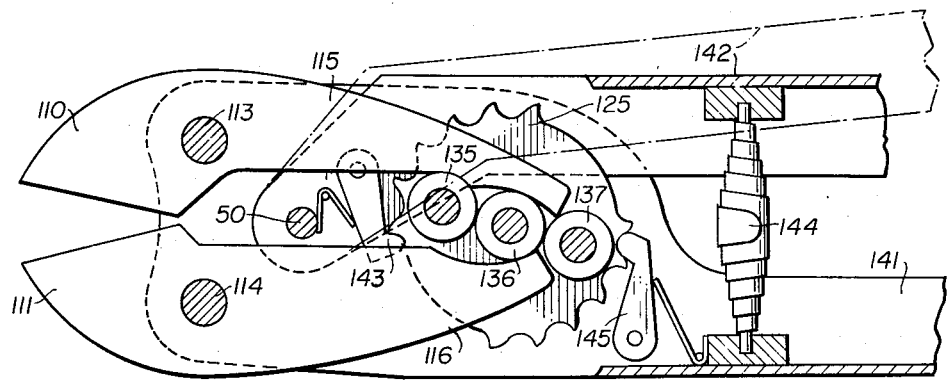

In Figure 5 there is illustrated a modification of the tool, wherein the ratchet mechanism operates in a reverse direction under the drive of a pivoted lever handle which is longer than the handle of the form shown in Figures 1 through 4, but having an overall tool length no greater.

There are basically no parts in the modification which differ from the like parts of the first embodiment. Therefore the same reference characters are employed in this view, increased by one hundred. For example, the ratchet wheel 25 of Figure 1 is indicated as 125 in this view.

In Figure 1 the handle 42 is pivoted on the same center as ratchet wheel 25. Otherwise it has not been given a reference numeral in Figure 1. Therefore, it is indicated in Figure 5 by reference numeral 50. This pivot 50 is located between the pivots 13 and 14 and the center of ratchet wheel 125. Thus, the length and mechanical advantage are increased with no increase in overall tool length.

There have been a number of patents granted suggesting the pivoting of the lever handle outside of the ratchet. However, it is not known that any suggestion has ever been proposed to produce the desirable increase of power ratio by placing the pivot point forward. It has always been placed to the rear of the wheel.

Further, in this improved modification, it may be observed that a greater rearward extension of the jaw levers is provided with a resultant greater leverage.

Pivoting on the ratchet wheel center provides greater simplicity of construction, which is desirable, but when extra power is needed, and greater tool length is undesirable, this modification will provide the power.

Having thus described how the ratchet device locks together with the pawl at the handle down, or stroke end, position the second outstanding advantage will become readily apparent. The ratchet can move in only one direction. Therefore, a full work cycle must be carried out once it has begun. The advantage of this arrangement is that human weakness cannot result in an incomplete work cycle. But the disadvantage is that if the handles are closed for any reason, a cycle begins and must be carried through. Thus, if the operator closes the handles while picking up the tool, or while inserting the tool into his pocket, he must take time to put the tool through the entire cycle before loading and using the tool.

But with the self locking feature of this invention, the drive lever handle stays in the stroke end position at the end of a cycle. The tool may be handled or stored without unintentionally beginning a new cycle.

Although the invention has been described in its preferred form with a certain degree of particularity, it is understood that the present disclosure of the preferred form has been made only by way of example and that numerous changes in the details of construction and the combination of parts may be resorted to without departing from the spirit and the scope of the invention as hereinafter claimed.

What is claimed is:

1. In a device having operating mechanism powered by a ratchet wheel and a cooperating lever and pawl, said lever having a spring urging the lever in a reverse pawl indexing direction, said lever having a drive movement opposed to said reverse direction, said lever movable to a drive limit position in said drive movement, the provision of means to hold said lever in said drive limit position, comprising, the provision of a plurality of teeth on said ratchet wheel, each tooth having a drive side engageable by said pawl upon drive movement of said lever, each tooth having a pawl indexing cam side engageable by said pawl upon movement of said lever in said reverse direction, means urging said pawl toward said teeth in a direction opposed to said cam indexing movement, means limiting said ratchet wheel to one direction of rotation resultant from said drive movement, said teeth of the ratchet wheel having a pawl-holding tooth serving as a series end tooth, said series end tooth having a drive side and a catch back side whereby the force required to index the pawl past the series end tooth is greater than the force required to index the pawl past the other teeth, the lever spring having a pawl indexing force less than the force required to index the pawl past the pawl-holding tooth.

2. A tool having an operating mechanism driven by a rotary ratchet wheel and having a pivoted lever and pawl providing manual drivability of said ratchet wheel, said pivoted lever having an arc of work path swing between a first and a second limit position, movement of said lever toward said first limit being a work stroke, movement of said lever toward said second limit being a reverse pawl indexing stroke, said operating mechanism having a work cycle with a rest position at the end of said cycle, said ratchet wheeling having a plurality of teeth for engagement by said pawl to produce rotary drive motion on said wheel, said pawl and teeth having mutually cooperating cam surfaces to pivot said pawl around succeeding teeth after a work stroke to index the pawl to a succeeding tooth, one of said teeth being coordinated to the operation of the operating mechanism to arrive at the position of being a next succeeding tooth upon movement of said operating mechanism to said rest postion and said lever to said first limit, said mutually cooperating cam surfaces of said one tooth and said pawl having a catch relationship requiring a resulting pawl indexing force of greater magnitude than the remaining teeth, and means urging said lever toward said second limit, said means having a pawl indexing force less than the force required to index the pawl past said one tooth.

3. A tool having an operating mechanism driven by a rotary ratchet wheel and having a pivoted lever and pawl providing manual drivability of said ratchet wheel, pivot means mounting said pawl for pivotal swinging movement on said lever, means limiting said ratchet wheel to one direction of rotation, said ratchet wheel having a plurality of drive teeth, said pawl having a tooth engaging end, said end having a bottom drive surface area and a top cam area, said ratchet wheel teeth each having a pawl receiving surface on the side thereof opposite the direction of the wheel rotation, said lever and pawl positioned to drive said tooth engaging end of the pawl in a forward drive direction when engaging said pawl receiving surfaces, said teeth each having a pawl indexing cam side opposite said pawl receiving surface, whereby said pawl indexing cam surface of each tooth will coact with the top cam area of the pawl tooth engaging end to move the pawl end over a given tooth upon reverse drive direction of the lever to index the pawl from one tooth to the next tooth, said ratchet wheel having a pawl-holding tooth at a series end position, said holding tooth having a drive side and a catch back side whereby the force required to index the top cam area of the pawl past the holding tooth is greater than the force required to index the pawl past the other teeth and the pawl is held engaged therewith until deliberately separated.

4. A ratchet device for cyclic drive actuation, comprising, a plurality of drive receiving members in spaced relationship, each drive receiving member having a driven cam surface, each drive receiving member having a work cycle path, the plurality of driven cam surfaces jointly defining a drive field area, a plurality of rollable members in a planetary system in said work field, said rollable members including planetary drive members to rotate and describe a circular outer path and thereby contact and actuate said driven cam surfaces and the remainder of said rollable members being located within the planetary members, said rollable members having surface contacting relationship across the planetary system to transmit reaction forces through the system for resistance externally of the system, a rotary ratchet wheel, said plurality of rollable members mounted on said ratchet wheel, a swingably pivoted lever and a spring urged pawl providing manual drivability of said ratchet wheel, means limiting said ratchet wheel to one direction of rotation, means urging said lever in a reverse ratchet indexing direction to a first position, said lever pivotable against said urging means in a drive appiying direction to a second position, said ratchet wheel having a plurality of teeth formed to receive said pawl in the drive direction of lever movement and rotate under drive force therefrom, said teeth having pawl indexing back surfaces which contact the pawl upon reverse movement of said lever for indexing said pawl with respect to the teeth, a pawl-holding series end tooth with a drive side and a catch back side whereby the force required to index the pawl past the series end tooth is greater than the force required to index the pawl past the other teeth, said means for urging said lever in a reverse ratchet indexing direction having a pawl indexing force less than the force required to index the pawl past the pawl-holding end tooth.

5. A ratchet driven plier type tool, comprising, a first and second jaw, said first and second jaws each having a work end and a drive receiving lever end, pivot means intermediate each said jaw for transposition of operating force on the drive receiving lever end into work force on the work end, said first and second jaw lever ends having first and second driven cam surfaces respectively and in opposed facing relationship defining an included drive field, a rotatable ratchet wheel, a plurality of rollable members carried by said ratchet wheel, said rollable members being in mutual surface contacting series position with one another across said drive field between said opposed first and second cam surfaces, first and second handle members, pivot means mounting said first handle member for swingable movement thereof, spring means urging said first handle member in an opening index direction, pawl means transmitting swinging movement of said first handle into drive force upon said ratchet wheel, said ratchet wheel having a plurality of teeth, a spring urging said pawl means against said ratchet wheel, means resisting movement of said ratchet wheel in a reverse direction, one of said ratchet wheel teeth having a surface to resist passing of the pawl means over the reverse side thereof as the pawl slides thereover to index, said resistance being in the form of a cam action having a component force in the direction of pawl pivoting of such low magnitude that the force of the pawl produced by the spring urging the lever is insufficient to overcome the force of the spring urging the pawl means.

6. A power device for cyclic drive actuation, comprising, first and second drive receiving members in spaced relationship, said first drive member having a first driven cam surface, said second drive receiving member having a second driven cam surface, said first and second driven cam surfaces positioned in opposed relationship and defining an expandable drive field, a rotatable ratchet wheel, a plurality of rollable members carried by said ratchet wheel, said rollable members being in surface contacting series position with one another across said drive field between said opposed first and second cam surfaces, and a pivoted lever and pawl to actuate said ratchet wheel, spring means urging said lever in an opening index direction, said rollable member series having a first position between said first and second drive receiving members wherein the drive receiving members are in a maximum closed position thereagainst, said rollable member series having a second position wherein the drive receiving members are in a maximum open position, said second position being about 90 degrees of rotation advanced from said first position, said first and second cam surfaces formed to drop out of active force receiving relationship with said rollable member series at a position of drive cessation upon an advance thereof beyond said second position, said ratchet wheel having two separate tooth series separated by two blank spaces around the periphery thereof and individually engaged by said pawl, said tooth series spaced to cease contact with said pawl upon driving said rollable series to said position of drive cessation, spring means urging said first and second drive receiving members closed upon said rollable series, whereby one said blank space of said ratchet wheel will thereby rotate rapidly past said pawl as the spring means takes over the drive of said ratchet wheel to said first position of the rollable series in a 180 degree rotated condition from the first position of the previous cycle, a first tooth of the next tooth series coming to rest at the final stroke position of said lever and pawl, said first tooth of each tooth series being a holding tooth, a spring urging said pawl means against said ratchet wheel, means limiting rotation of said ratchet wheel to a forward drive direction, said holding tooth having a back surface form resisting the passing of the pawl as the pawl slides thereover to index, said resistance being in the form of a cam action having a component force in the direction of pawl pivoting of such low magnitude that the force of the pawl produced by the spring urging the lever is insufficient to overcome the force of the spring urging the pawl means.

7. A drive device, comprising, a drive receiving member having a plurality of teeth including a pawl holding end tooth, a pawl, guide means directing said pawl in a reciprocable path adjacent said drive receiving member, means to drive said pawl in said path in a forward drive direction, means of substantially uniform driving force to drive said pawl in a reverse drive direction, each of said teeth having a forward pawl engaging surface formed to receive complemental pawl surfaces and impart driving force from the pawl to the drive receiving member, said pawl path orientated with respect to said drive receiving member to direct the pawl in a drive delivery direction, means yieldably urging said pawl into engagement with said teeth, each of said teeth having a back surface, movement of said pawl in said reverse drive direction causing said pawl to engage the back of a succeeding tooth, each tooth back surface and said pawl formed to produce a cam force opposed to said yieldable means of the pawl and thereby cause indexing of the pawl over a tooth during said reverse drive of the pawl, at least one said tooth back having a very low pawl camming action to require a pawl reverse drive indexing force greater than said uniform reverse driving force, and the balance of said back surfaces having a pawl camming action requiring a pawl reverse drive indexing force less than said uniform reverse drive force.

References Cited in the file of this patent

UNITED STATES PATENTS

| | | |
|---|---|---|
| 1,024,432 | Barron | Apr. 23, 1912 |
| 2,339,880 | Romanoff | Jan. 25, 1944 |
| 2,413,178 | Feltman | Dec. 24, 1946 |
| 2,618,993 | Carlson | Nov. 25, 1952 |
| 2,705,432 | Lazar | Apr. 5, 1955 |